July 9, 1935. R. B. BENJAMIN 2,007,174
PANEL BOARD SYSTEM
Filed Feb. 29, 1932 12 Sheets-Sheet 1
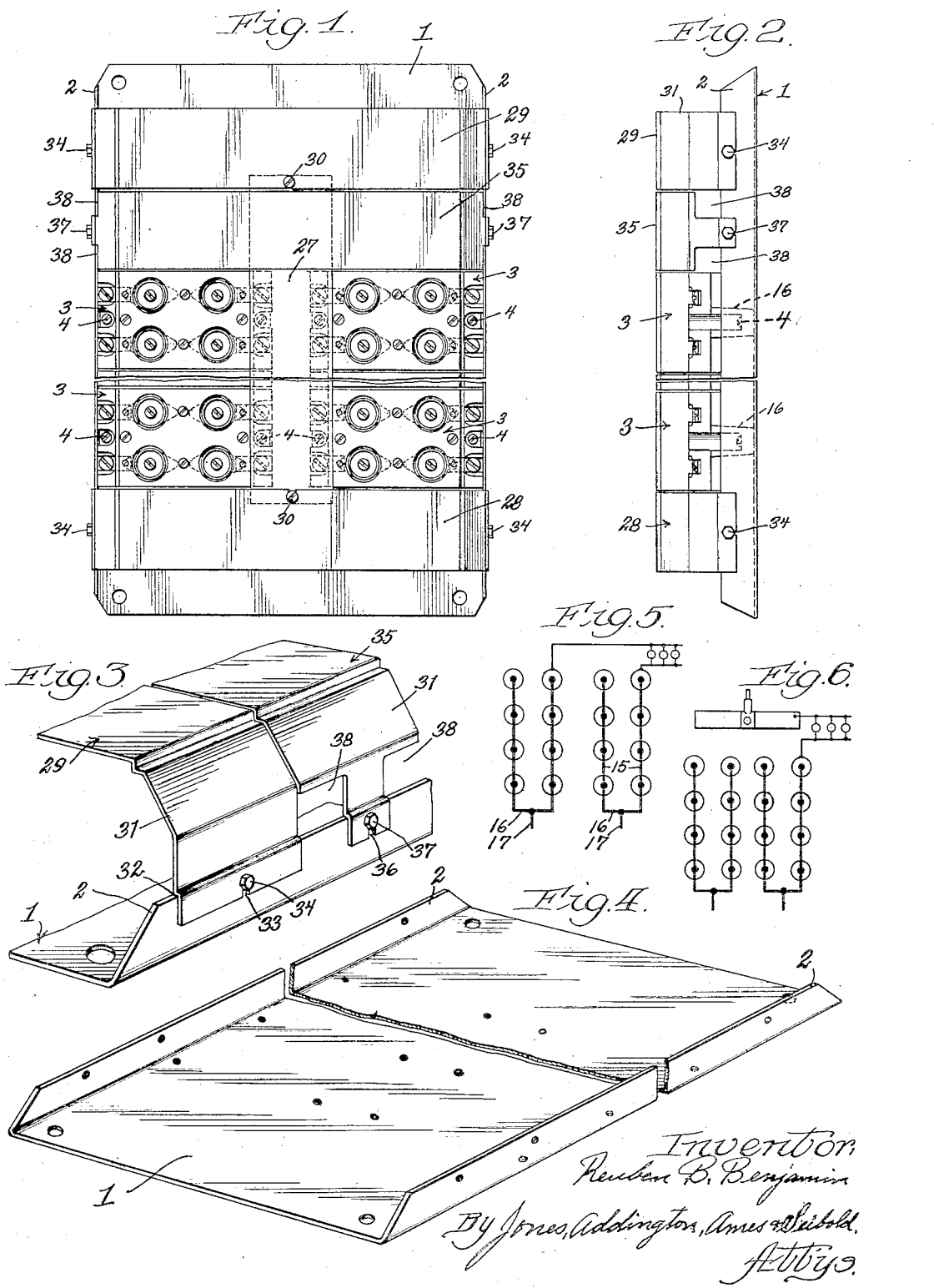

July 9, 1935.  R. B. BENJAMIN  2,007,174
PANEL BOARD SYSTEM
Filed Feb. 29, 1932  12 Sheets-Sheet 2
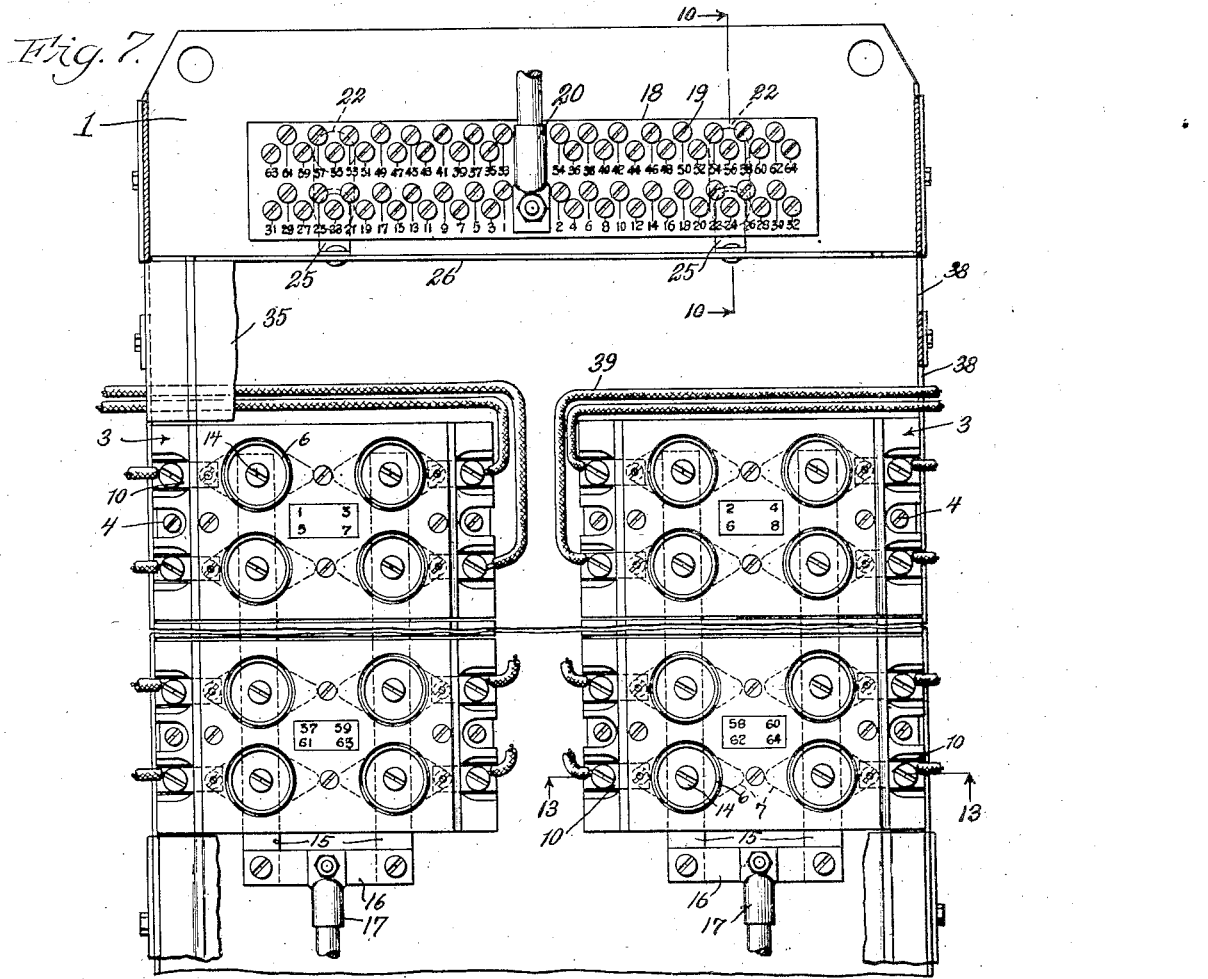
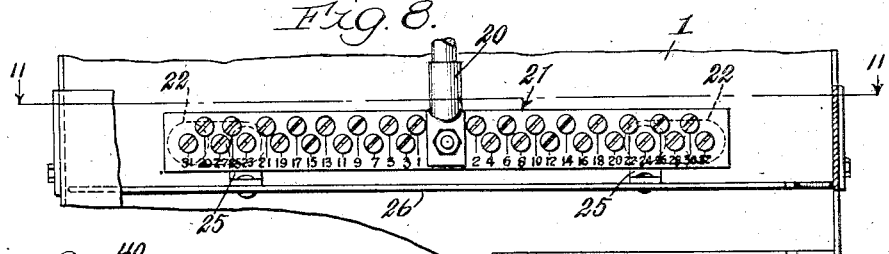
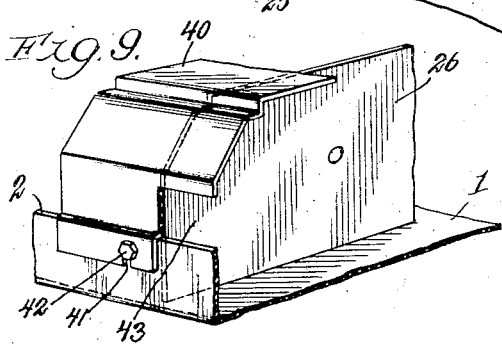
Inventor:
Reuben B. Benjamin
By Jones, Addington, Ames & Seibold
Attys.

July 9, 1935.    R. B. BENJAMIN    2,007,174
PANEL BOARD SYSTEM
Filed Feb. 29, 1932    12 Sheets-Sheet 3
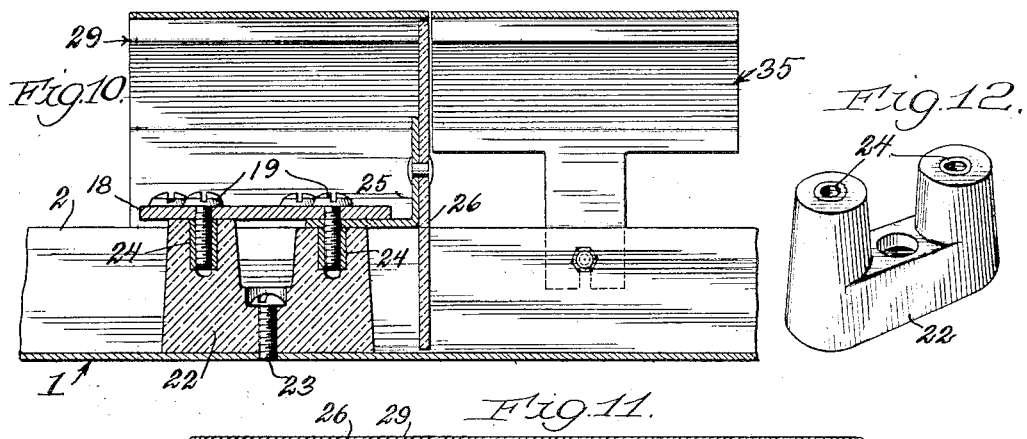
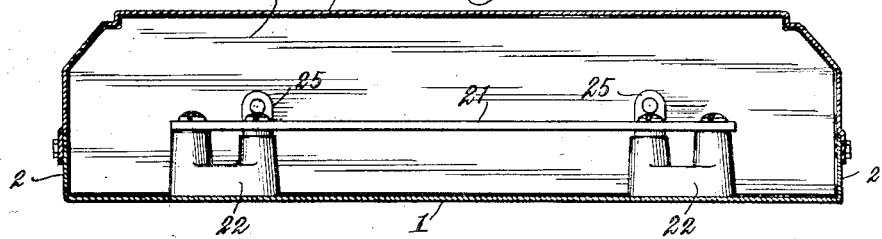
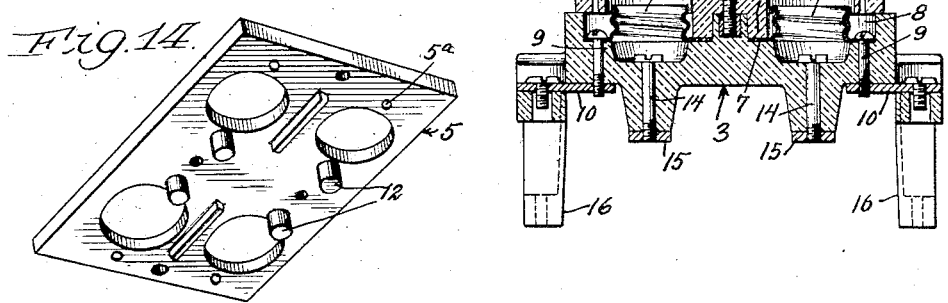
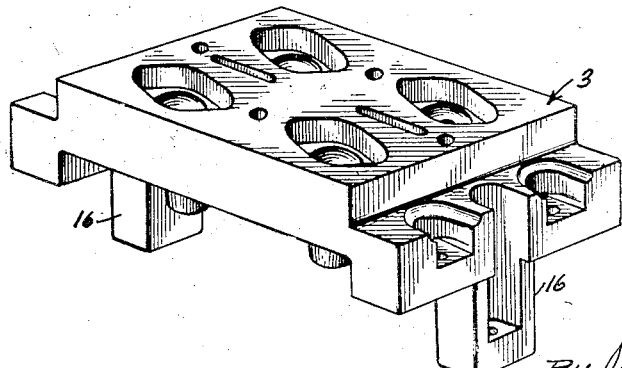
Inventor:
Reuben B. Benjamin
By Jones, Addington, Ames & Seibold
Attys.

July 9, 1935.  R. B. BENJAMIN  2,007,174
PANEL BOARD SYSTEM
Filed Feb. 29, 1932  12 Sheets-Sheet 4
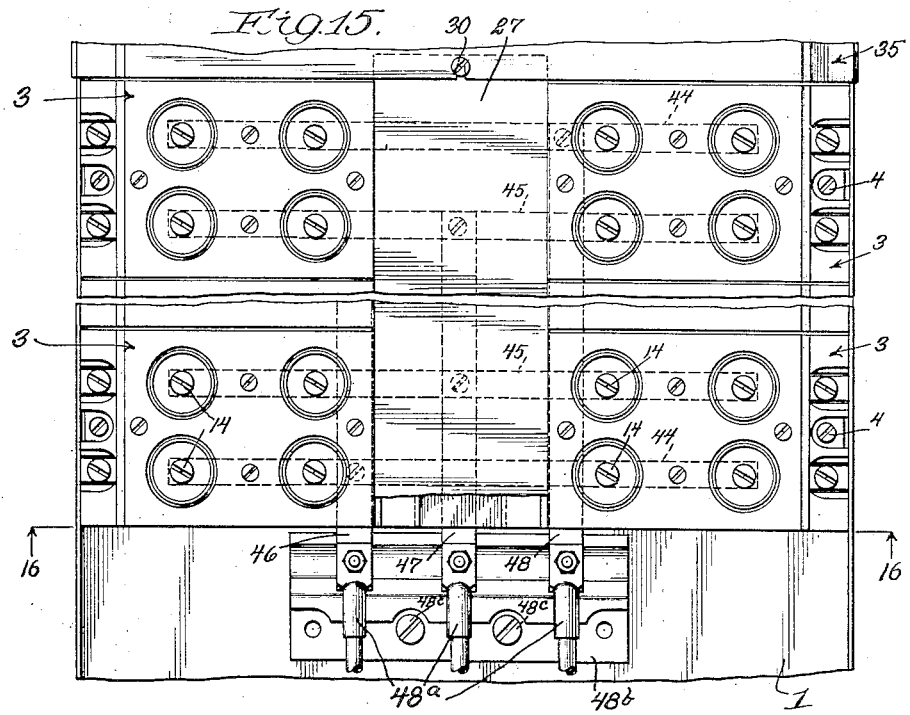
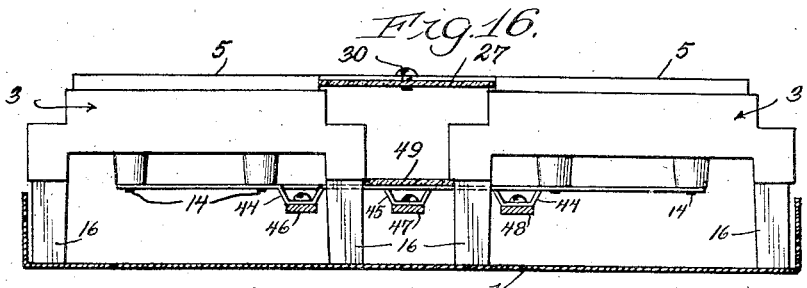
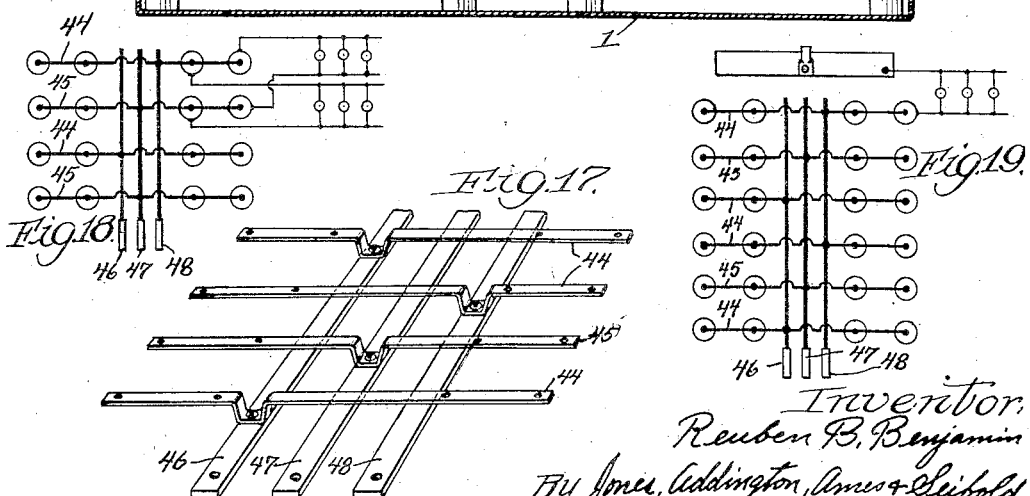
Inventor.
Reuben B. Benjamin
By Jones, Addington, Ames & Seibold
Attys.

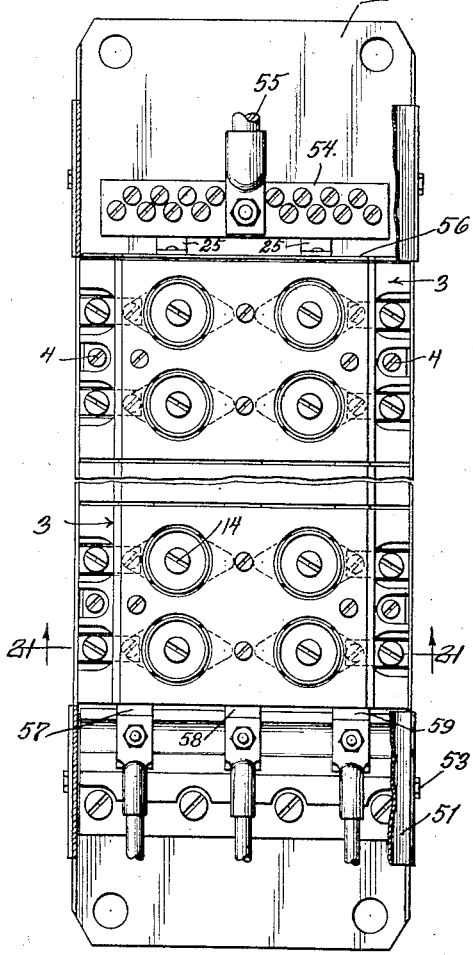
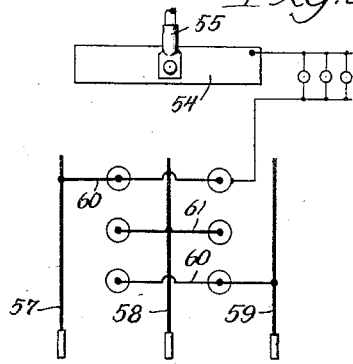
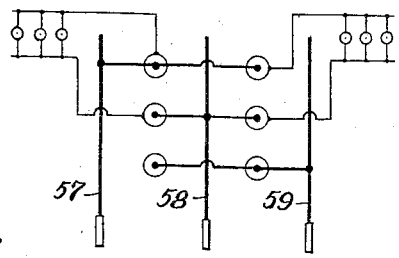
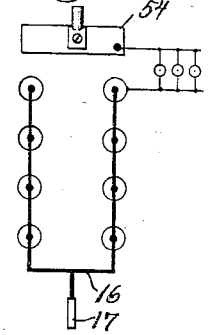
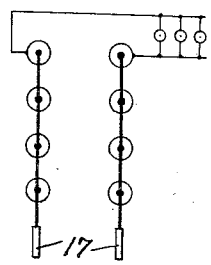
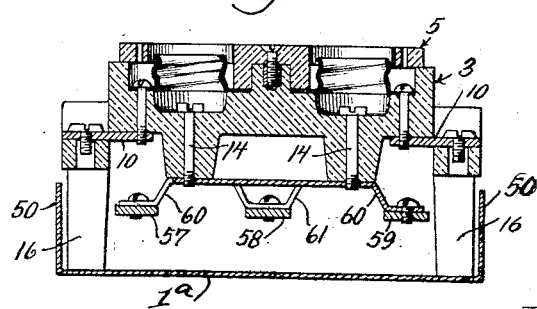

July 9, 1935.　　　　R. B. BENJAMIN　　　　2,007,174
PANEL BOARD SYSTEM
Filed Feb. 29, 1932　　　12 Sheets-Sheet 8
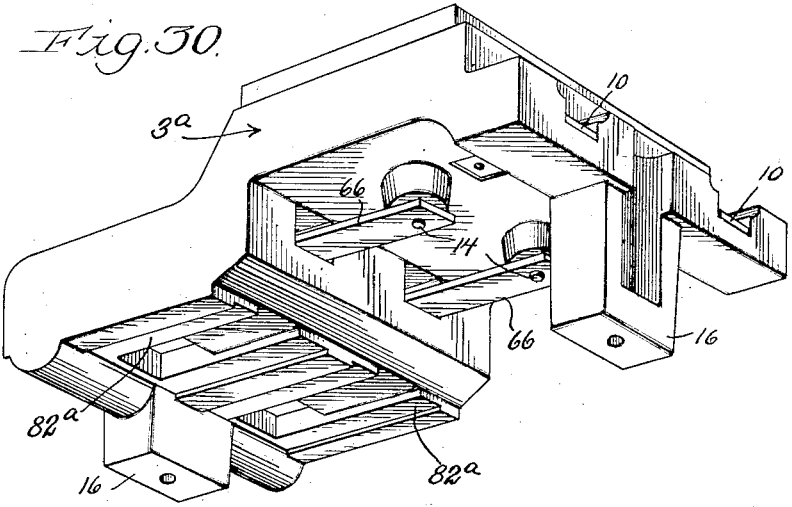
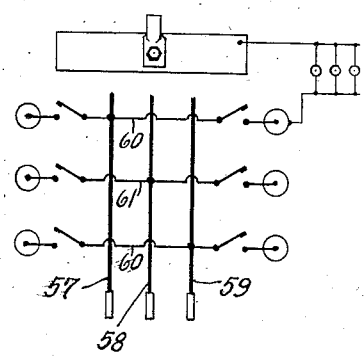
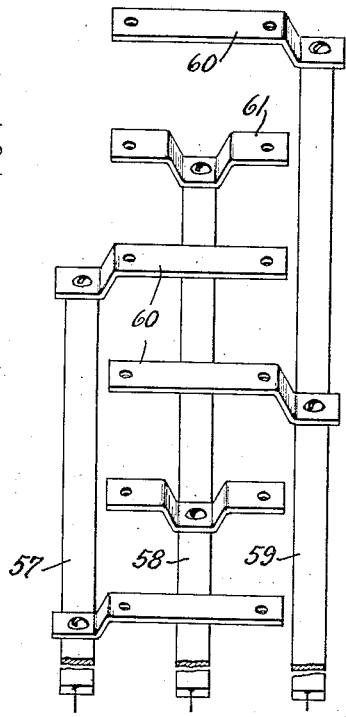
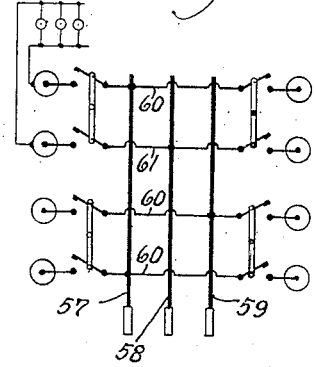
Inventor:
Reuben B. Benjamin
By Jones, Addington, Ames & Seibold
Attys.

July 9, 1935.  R. B. BENJAMIN  2,007,174
PANEL BOARD SYSTEM
Filed Feb. 29, 1932    12 Sheets-Sheet 9
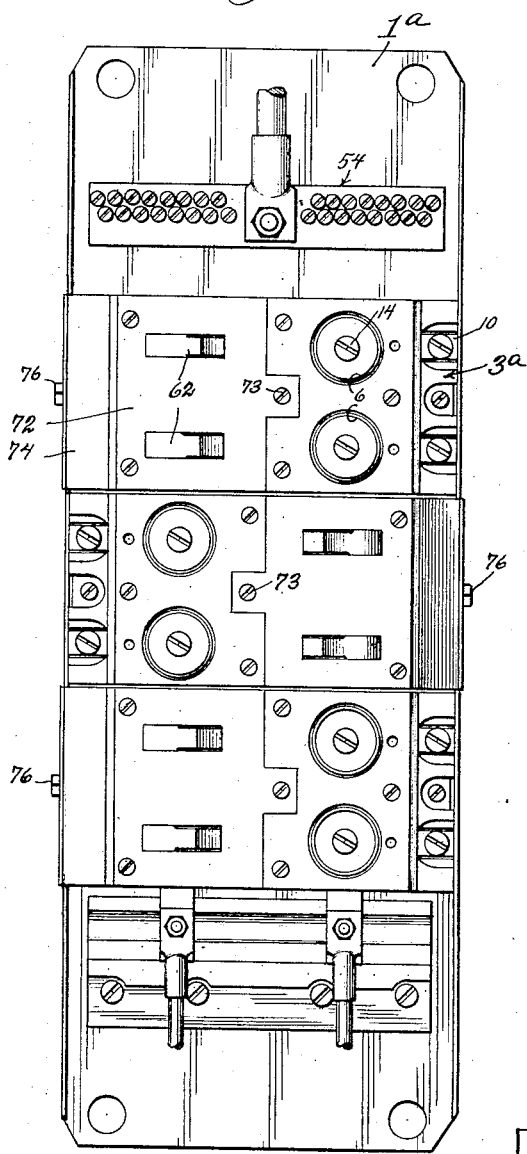
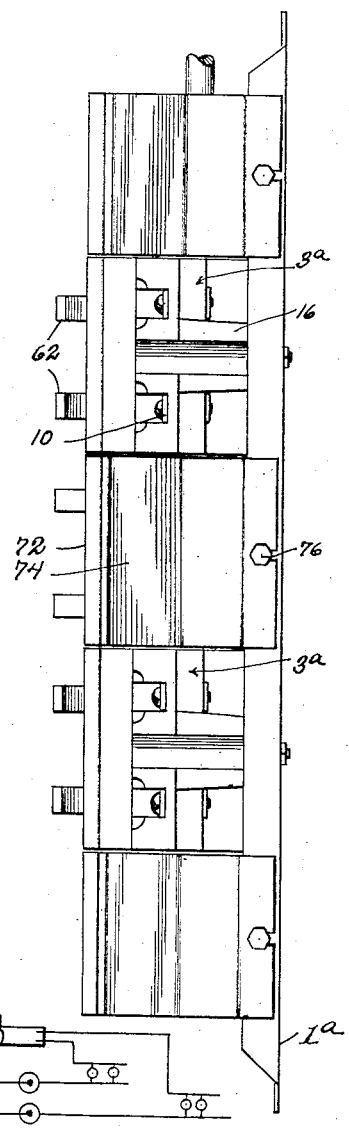
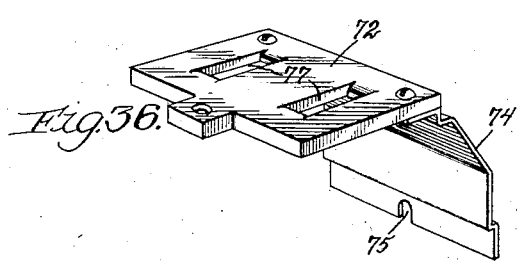
Inventor:
Reuben B. Benjamin
By Jones, Addington, Ames & Seibold
Attys July 9, 1935. R. B. BENJAMIN 2,007,174
PANEL BOARD SYSTEM
Filed Feb. 29, 1932 12 Sheets-Sheet 10

Inventor:
Reuben B. Benjamin
By Jones, Addington, Ames & Seibold,
Attys.

Inventor:
Reuben B. Benjamin
By Jones, Addington, Ames & Seibold
Attys.

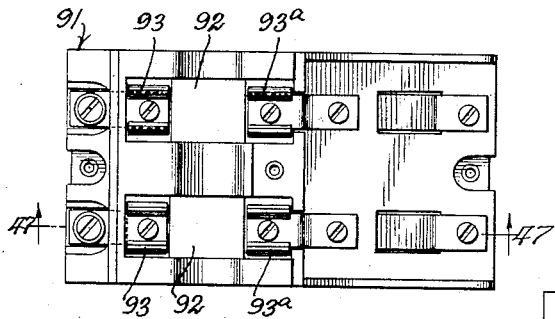
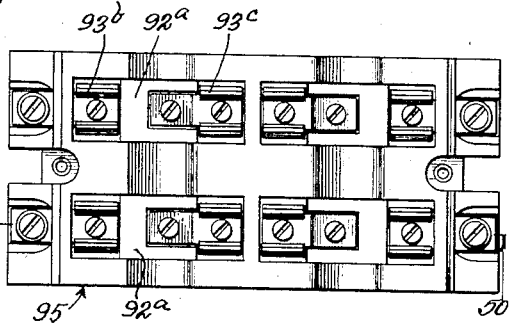
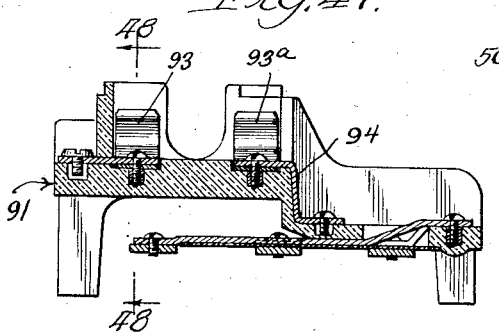
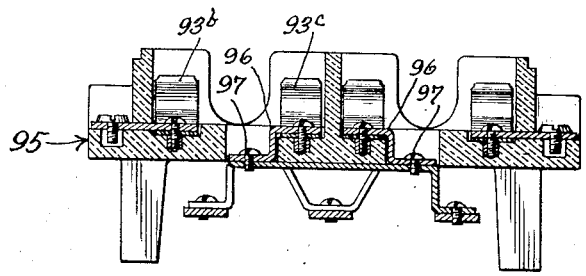
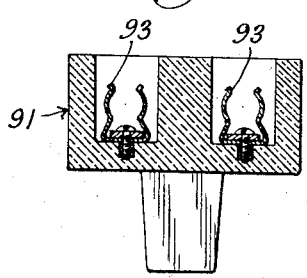

Patented July 9, 1935

2,007,174

UNITED STATES PATENT OFFICE 2,007,174

PANEL BOARD SYSTEM

Reuben E. Benjamin, Chicago, Ill., assignor to Benjamin Electric Manufacturing Company, Des Plaines, Ill., a corporation of Illinois Application February 29, 1932, Serial No. 595,811

13 Claims. (Cl. 247—10)

This invention relates to panel boards, and more particularly to panel boards for use in connection with electric lighting and power distributing systems. The present invention provides a panel board system wherein a minimum number of basic units and other component standardized panel board parts may be easily assembled and adapted for use with a maximum number of the various lighting systems in common use, and which will fully satisfy the main circuit wiring and phase requirements, as well as providing for any desired number, kind and direction of branch circuits and fuse and/or switch requirements.

It is a further object of my invention to provide an interchangeable panel board construction which will avoid the difficulties and objections of the usual distributing methods of the prior art and wherein the interchangeable features allow a minimum number of the same stock parts to be interchangeably used in assembling panel boards of various capacities.

This invention provides a system which, in the present embodiment, includes basic interchangeable branch crcuit units having suitable fuse connections thereon and whereby, by the use of these units and a systematized arrangement of interchangeable bus-bars and bus-bar connections, any desired one of a plurality of circuits and fuse and switch combinations may be provided to accommodate substantially all of the ordinary switch board and associated electrical circuit requirements including single or double fuse branch circuits, either with or without switches. The basic branch circuit units may be arranged to receive a desired type of standard fuses with all bus-bar and circuit connections remaining the same.

A further object of this invention consists in the production of an improved and simplified construction whereby a comparatively inexpensive panel board is obtained, and in which construction the mounting space necessary for the bus-bars, switches, fuses and other current-carrying parts is minimized so as to obtain a very compact, as well as efficient structure.

The present invention provides a panel board construction which is especially adapted for use in the ordinary cabinet or panel board box, which latter is ordinarily made of sheet steel or other suitable material and in which the panel board is arranged to be mounted. The entire panel board assembly is secure to a suitable base plate which may be of a size corresponding to the number of branch circuits required and on which the component parts of the panel board are assembled before being secured to the cabinet.

The present system provides for a panel board arranged to satisfy all the requirements of main circuits having a common return and it is an object to provide a novel and efficient terminal support for the common return terminal and which may be interchangeably used for terminals corresponding to the number of branch circuits.

The invention also provides a novel gutter arrangement and association of parts whereby suitable gutter walls and covers are supplied with a minimum number of easily assembled parts and wherein the covers are easily removed and replaced to provide convenience in wiring.

A further object is the provision of terminal insulating means whereby bus-bars and terminal lugs of various capacities corresponding to particular panel board requirements may be interchangeably mounted in the same panel board assembly.

The invention also contemplates an interchangeable system capable of providing either wire or narrow panel boards, of the same basic units and cooperating parts and which may be either right or left hand, or staggered branches, and in which, in any case, the circuits may be balanced to conform to standard practice.

Further objects will be apparent from the specification and the appended claims.

In the drawings:

Figure 1 is a plan view of a panel board illustrating one embodiment of my invention and assembled ready for mounting in a panel board box or cabinet;

Fig. 2 is a side elevation of the embodiment illustrated in Fig. 1;

Fig. 3 is a fragmentary perspective view of the gutter and terminal covers and illustrates the method of removably and interchangeably supporting them on the base plate;

Fig. 4 is a perspective view of one of the base plates on which the component parts of the panel board are to be mounted;

Fig. 5 is a wiring diagram illustrating one form of bus-bar and circuit arrangement for use with the embodiment illustrated in Fig. 1, for providing a two-wire panel board having double fuse branch circuits, without switches;

Fig. 6 is a wiring diagram illustrating the electrical circuit arrangement for a three-wire circuit having single fuse branch circuits with a common return and without switches;

Fig. 7 illustrates the same embodiment shown in Fig. 1 but with the gutter and terminal covers broken away and showing the terminal and bus-bar arrangement for a three-wire, two-phase single fuse panel board without switches, the neutral or common return terminal illustrated being arranged for a sixty-four circuit panel board;

Fig. 8 is a detailed plan view of a thirty-two circuit neutral terminal for use with smaller panel boards;

Fig. 9 is a fragmentary perspective view of the terminal cover and mounting as used with the small neutral terminal illustrated in Fig. 8;

Fig. 10 is a transverse detailed sectional view taken on a line corresponding to line 10—10 of Fig. 7 and illustrates the method of mounting a sixty-four circuit neutral terminal and the gutter insulator or partition;

Fig. 11 is a transverse sectional view taken on a line corresponding to line 11—11 of Fig. 10 and illustrates the method of mounting the small thirty-two circuit neutral terminal by means of the same interchangeable mounting block used for the larger sixty-four circuit terminal;

Fig. 12 is perspective view of the neutral-terminal mounting block illustrated in Figs. 10 and 11;

Fig. 13 is a detailed sectional view through the fuse block and bus-bars and taken on a line corresponding substantially to 13—13 of Fig. 7;

Fig. 14 is a perspective view of the fuse block and cover with all of the conducting parts removed;

Fig. 15 illustrates the same panel board structure as shown in previous views, but with the bus-bar mounting and fuse connections arranged for either a three or four-wire main circuit;

Fig. 16 is a transverse sectional view taken on a line corresponding to 16—16 of Fig. 15;

Fig. 17 is a perspective view of the bus-bars and fuse conductors used in the arrangement shown in Figs. 15 and 16;

Fig. 18 is a wiring diagram arranged for use with a three-wire, three-phase circuit having double fuse branch circuits without switches;

Fig. 19 is a wiring diagram illustrating the bus-bar and fuse connections arranged for use with a four-wire, three-phase common return circuit having single fuse branch circuits without switches;

Fig. 20 is a top plan view of an embodiment of my invention arranged to provide a four-wire, common return narrow panel board without switches;

Fig. 21 is a transverse sectional view taken on a line 21—21 of Fig. 20;

Fig. 22 is a wiring diagram illustrating the bus-bar and circuit arrangement for use with a four-wire, three-phase circuit having single fuse branch circuits with a common return and is arranged for use with the narrow switchless panel board illustrated in Fig. 20;

Fig. 23 is a similar wiring diagram but arranged for use with a three-wire, three-phase circuit having double fuse branch circuits;

Fig. 24 is a wiring diagram also showing an arrangement for use with a narrow panel board as illustrated in Fig. 20 but with the bus-bar and connections arranged to provide a two-wire circuit having single fuse branch circuits.

Fig. 25 is a wiring diagram somewhat similar to Fig. 24 but arranged for use with a two-wire circuit having two-fuse branch circuits without switches and also adapted for use with the embodiment shown in Fig. 20;

Fig. 30 is a perspective view of the fuse and switch block illustrated in Figs. 26 and 28;

Fig. 31 is a perspective view of bus-bars and switch connectors used in connection with the embodiment illustrated in Figs. 26 to 29, inclusive;

Fig. 32 is a wiring diagram illustrating the method of connecting the bus-bars and switches for a four-wire, three-phase main circuit having single fuse branch circuits with a common return and single pole switches;

Fig. 33 is a wiring diagram of the circuit arrangement for a three-wire, three-phase main circuit having double fuse branch circuits and double pole switches in the branch circuits;

Fig. 34 is a top plan view of a narrow panel with the fuse blocks arranged in staggered relation to provide alternate branch circuits in opposite directions, the arrangement being shown for a three-wire common return circuit;

Fig. 35 is a side elevation of the embodiment illustrated in Fig. 34;

Fig. 36 is a perspective view of the switch cover which may be of a single piece of insulation if desired;

Fig. 36a is a wiring diagram for a three-wire circuit with single fuse branches and single pole switches, as used in the staggered panel illustrated in Figs. 34 and 35;

Fig. 46 is a top plan view of one of the fuse and switch blocks provided with suitable clips for holding standard cartridge fuses instead of standard plug fuses;

Fig. 47 is a longitudinal sectional view taken on a line corresponding to line 47—47 of Fig. 46, the bus-bars and connectors being arranged for a three or four-wire circuit;

Fig. 48 is a transverse sectional view taken on a line corresponding to line 48—48 of Fig. 47;

Fig. 49 is a top plan view of one of the switchless fuse blocks provided with suitable clips for retaining cartridge fuses instead of plug fuses; and Fig. 50 is a longitudinal sectional view taken on a line corresponding to line 50—50 of Fig. 49 with the bus-bars and connectors arranged for use with a three or four-wire circuit.

Figure 26:
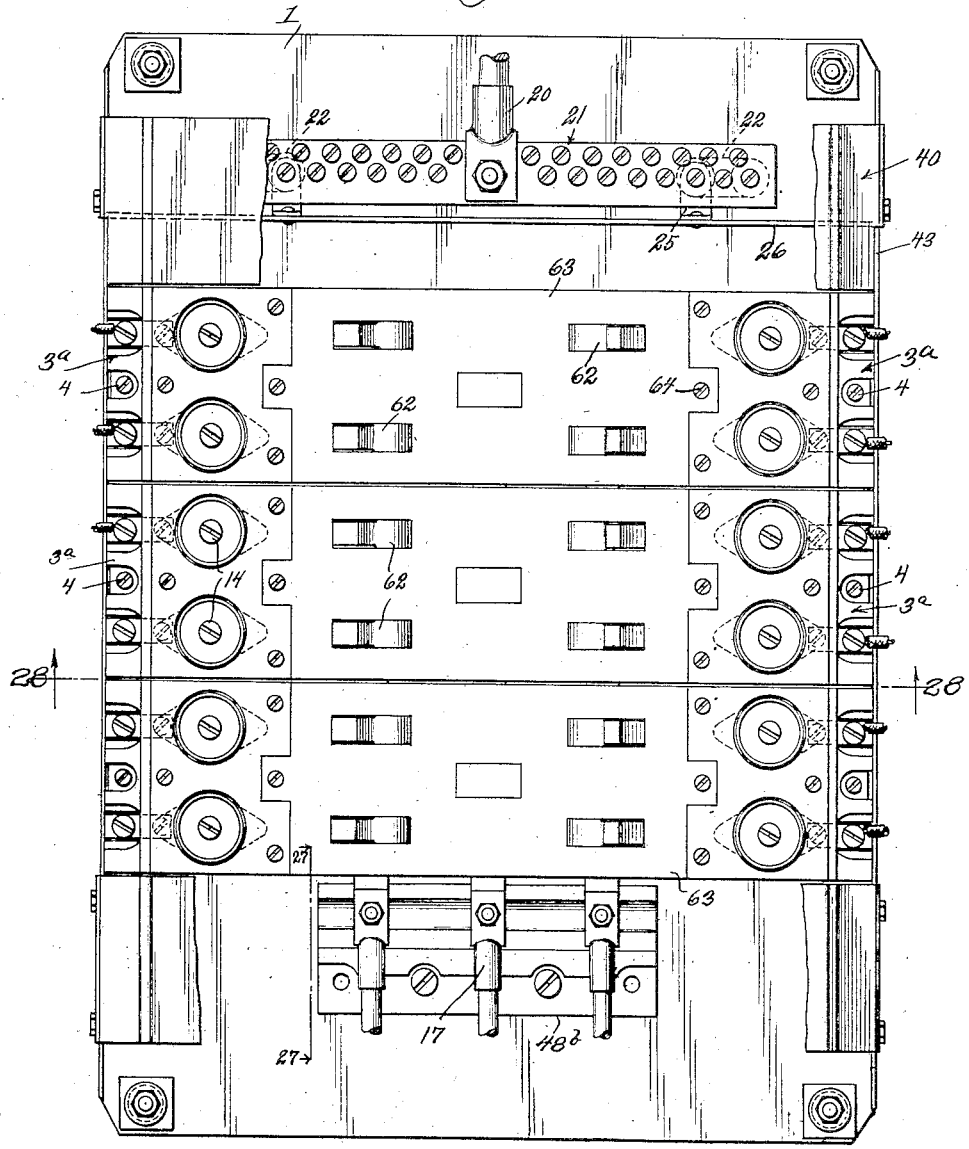
Fig. 26 is a top plan view of a wide panel board having single pole switches and fuses in the branch circuits, the bus-bar arrangement shown being arranged for use with a four-wire, three-phase common return circuit.

Referring to the drawings in detail, the embodiment illustrated comprises four basic fuse holding elements or so-called fuse blocks, two of which are each provided with a plurality of fuse holders only, the other two being provided with a pair of fuse holders and either two single pole switches or one double pole switch, the single and double pole switches being interchangeably mountable in the switch units. These elements are assembled fuse blocks forming units which may be interchangeably and reversibly used in connection with suitable cooperating parts to provide panel boards adaptable for use with any of the ordinary lighting circuits in common use. These elements or units are all of the same width, preferably three inches wide, so that the panels may vary in length by the width of the unit.

In this invention the component parts may be assembled in various interchangeable relations to provide either a wide or narrow panel board conforming to the electrical and mechanical requirements of a particular installation. One of the wide panel boards is illustrated in detail in Figs. 1 to 14 and comprises a base plate 1 on which all of the parts are supported and which is arranged to be mounted in a suitable panel board box or cabinet after the panel board has been assembled. These base plates are preferably of sheet metal and formed as illustrated in Fig. 4 with upturned side flanges 2. The base plates may be provided in a variety of standardized lengths, each plate being of a suitable length to provide for a panel board having a definite number of branch circuits, the plate 1 being adapted for use with a wide board.

Fuse blocks 3 are mounted on the base plate by means of screws 4 which are threaded into the base plate 1. These fuse blocks are mounted on the base plate in parallel rows in spaced relation so that the fuses therein are preferably in alignment. The construction of the fuse block and associated parts is illustrated in detail in Fig. 13, the fuse block 3 being of suitable insulating material and provided with a plate or cover 5, also of insulating material, which is arranged to cover otherwise exposed conducting parts and also to assist in holding the fuse sockets or threaded shells 6 in assembled relation.

The threaded shells 6 are preferably of the short type similar to those disclosed and claimed in my Patents No. 1,523,101 dated January 13, 1925, and No. 1,758,642 dated May 13, 1930, and each shell is provided with a flange 7 whereby the shell may be supported and secured in a recess 8 in the fuse block 3. One side of the threaded shell is secured in the fuse block by means of a screw 9 and a branch circuit binder plate 10, having a suitable binder screw thereon to receive a branch circuit wire. The opposite side of the threaded shell is retained in position by means of a lug 12 on the cover 6 which lug engages the flange 7, the cover 5 being secured by means of screws 13 in suitable threaded bushings in the fuse block base 3. Test holes 5a are provided in alignment with the shell screws 9 to afford access thereto for testing purposes.

Each fuse block is preferably with four fuse sockets and associated conducting parts, as illustrated. Screws 14 are supported in the base 3 in a position to form center contacts for the fuses. These screws are, in the present instance, threaded into suitable interchangeable bus-bars 15 which are thereby clamped against and supported on the fuse block base 3. Each fuse block is provided with downwardly extending legs 16 arranged to receive the mounting screws 4, whereby the fuse block is secured to and supported on the base plate, the bus-bars 15 being supported on the fuse blocks in spaced relation to all conductors or conducting material in conformity with standard practice.

It will be understood that suitable branch circuits may be either of the single or double fuse type using only a single fuse block, or a plurality of fuse blocks 3 may be mounted on the base plate as shown in Fig. 1 to provide for any desired number of branch circuits, and as illustrated in Fig. 7 the bus-bars 15 may be connected by means of a cross bar 16 to a suitable terminal 17. A neutral terminal plate 18 having any desired number of binder screws 19 may be mounted on a suitable support to form a part of the panel board and may be provided with a terminal 20.

The binder screws 19 on the neutral terminal plate 18 are preferably numbered as shown to correspond with branch circuits numbers on the fuse blocks and in the embodiment shown in Fig. 7 will accommodate any number of common return branch circuits up to and including sixty-four. For panel boards of thirty-two circuits or less a smaller neutral terminal plate 21 (Fig. 8) may be provided which will accommodate all capacities of panel boards up to and including thirty-two branch circuits.

The neutral terminal plates are supported on suitable insulating blocks 22 which latter are secured to the base plate 1 by means of screws 23 threaded therein. The supporting block 22 is provided with threaded bushings 24 which are in a suitable spaced relation to receive either the binder screws 19 on the sixty-four circuit terminal plate 18 when the block is in the relation shown in Figs. 7 and 10, or the block may be rotated on the screw 23 to a position to receive the binder screws on the small neutral thirty-two circuit terminal plate 21. One side of the insulating block 22 is slightly shorter than the other whereby angle brackets 25 may be supported thereon, as illustrated, and to which is secured an insulating partition 26. This partition provides a suitable insulating wall for purposes which will be described later. It will, therefore, be seen that the terminal plates 18 and 21 may be interchangeably mounted on the same supporting blocks 22 which are also interchangeable and reversible, and the binder screws 19 form suitable securing means for the terminal plates.

The rows of fuse blocks are in spaced relation on the base plate 1 to provide a wiring gutter therebetween. This gutter is provided with a suitable cover 27 which extends underneath and is supported on terminal covers 28 and 29 by means of screws 30 in slots 30a. The terminal covers 28 and 29 are arranged to cover the terminals 17 and the neutral terminal plate 18, respectively. These terminal covers are interchangeable and are preferably sheet metal plates provided with angularly disposed, downwardly extending end portions 31 having shoulders 32 arranged to rest on the upturned flange 2 of the base plate. These downwardly-extending portions overlap the base flange 2 and are provided with slots 33 through which extend suitable screws 34, which latter are threaded into the base plate flange whereby the covers may be easily locked in position or removed therefrom for convenience in wiring.

The insulating partition 26, adjacent the neutral terminal plate, is positioned in spaced relation to the adjacent fuse blocks to provide a transverse gutter communicating with the longitudinal gutter between the fuse blocks. This transverse gutter is provided with a cover 35 which conforms to the contour of the terminal covers 31 and 32 and which is secured to the base plate in a similar manner by means of slots 36 and screws 37. Each side, however, of the downwardly-extending end portion is cut away to provide openings 38 for the passage of the branch circuit wires 39 which are connected to the fuse block terminals adjacent the longitudinal gutter. The return wires of the branch circuits are to be secured to the neutral terminal plate when the panel board is used for single fuse work.

When the small thirty-two circuit neutral or common return terminal plate is used, a large transverse gutter is not needed and therefore the panel board may be considerably shortened by using the cover arrangement shown in Fig. 9, in which a cover plate 40 is provided to cover both the terminal plate and gutter and which is of a similar contour to the covers previously described, but which provides a cover for the terminal plate 21 and extends over and beyond the insulating partition 26 to provide a narrow gutter between the terminal plate and the adjacent fuse block. The cover 40 is secured to the base plate in the same manner as the covers previously mentioned by means of a slot 41 and a screw 42, and the downwardly-extending portion is cut away at 43 to provide a passage for the branch circuit wires.

It is obvious that the structure just described may be wired in accordance with either of the diagrams illustrated in Fig. 5 or 6.

Fig. 5 illustrates one method of wiring the panel board just described to provide a two-wire panel board having double fuse branch circuits without switches. When the board is wired in accordance with the diagram in Fig. 5 the common return neutral terminal may be eliminated.

Fig. 6 illustrates a method of wiring for a three-wire circuit having single fuse branch circuits with a common return and without switches.

The invention provides an interchangeable system which is adaptable to a variety of circuit requirements and when it is desired to provide a panel board adapted for certain types of three and four-wire circuits, the device may be adapted therefor by means of the interchangeable bus-bar and fuse connector arrangement shown in Figs. 15 to 19, inclusive. In this adaptation interchangeable and reversible fuse connector bars 44 and 45 are connected to the center contacts of the fuse sockets in staggered relation as illustrated in Figs. 15 through 19 and suitable bus-bars 46, 47 and 48 are connected thereto as shown. The fuse connectors 44 and 45, therefore, provide supports for the bus-bars whereby they are retained adjacent the center of the panel board and in spaced relation conforming to standard practice.

The method of connecting the fuse connectors 44 and 45 to the bus-bars in staggered relation provides a suitable method of balancing the branch circuits relative to the main circuit. In this adaptation, an insulating plate 49 is supported on the fuse connectors and is retained in position by engagement with the fuse blocks, as shown in Figs. 15 and 16, and provides a suitable insulation in the longitudinal gutter between the branch circuit wires and the bus-bars and connections. It is obvious that these interchangeable bus-bar connections provide an efficient means for adapting the panel board for circuits such as are diagrammatically illustrated in Figs. 18 and 19, in which Fig. 18 illustrates the method of wiring for a three-wire, three-phase circuit having double fuse branches without switches, in which case the neutral terminal plate is not used or may be entirely eliminated.

Fig. 19 illustrates the method of wiring for a four-wire, three-phase circuit having single fuse branches with a common return. The bus-bars 46, 47 and 48 are provided with the usual terminal lugs 48a secured thereto and which are supported on an insulating block 48b which is secured to the base plate 1 by means of screws 48c. This same insulating block is arranged to support any of the lugs and bus-bars used in this interchangeable system, regardless of their size or capacity, and without change in the block or any of the connections. This block and the method of supporting the bus-bars and connections is illustrated in Fig. 7 and will be described later in detail. As previously stated, the invention is adaptable for use with either a wide or narrow panel, that is, a panel having two spaced rows of fuse blocks, forming a gutter therebetween, or a single row of fuse blocks, as illustrated in Figs. 20 and 21.

In order to assemble the parts to provide a narrow panel, narrow base plates 1a are provided on which the fuse blocks 3 are secured in the same manner as previously described. These plates are similar to the wide plates 1 and also are provided with upturned flanges 50 which are arranged to support suitable terminal covers 51 and 52 which are similar in contour to the covers 31 but of a length corresponding to the width of the narrow base plate 1a. These covers are also supported in place by screws 53 in the same manner as the covers 31 and are arranged to cover the main line terminals and a short neutral terminal plate 54 to which the common return wire 55 is secured. This terminal plate 54 is supported on the same insulating supporting blocks 22 previously described, and the brackets 25 may be secured to and support an insulating partition 56 by which all of the conducting parts of the fuse blocks and bus-bars are completely insulated from the neutral terminal.

In this adaptation, the same interchangeable bus-bars (indicating as 57, 58 and 59) of a suitable capacity may be used. The interchangeable fuse connectors 60 and the connector 61 are arranged as illustrated in Fig. 31 and connected to the bus-bars and fuse center contacts as indicated in the wiring diagrams (Figs. 22 and 23). In this arrangement the three bus-bars 57, 58 and 59 are supported underneath the fuse blocks by means of these connectors and are thereby retained in their proper spaced relation. This adaptation may be wired as indicated in Figs. 22 and 23 in which Fig. 22 illustrates the wiring for a four-wire, three-phase circuit having single fuse branches with a common return, and Fig. 23 illustrates the wiring arrangement for a three-wire, three-phase circuit having double fuse branches.

When it is desired to adapt the narrow panel just described for use with the circuits illustrated in Figs. 24 and 25, the bus-bar arrangement shown in Fig. 7 may be used in which the bus-bars 15 are secured directly to the fuse center contacts. This is illustrated in Fig. 24 which also illustrates the method of wiring for a two-wire circuit having single fuse branches and a common return.

Fig. 25 illustrates a method of providing a two-wire circuit having double fuse branches in which case the bus-bar connector 16 is removed and the terminal lugs 17 are secured directly to the bus-bars.

Figure 42:
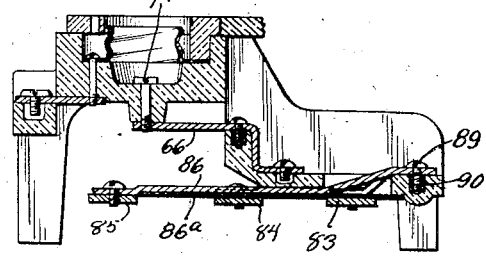
Fig. 42 is a sectional view through the combined switch and fuse block and taken on a line corresponding to line 42—42 of Fig. 41.

In order to provide a wide panel board having switches in the branch circuits, and adaptable for various circuit requirements, a fuse block 3a is provided which is similar to the fuse block 3 except that two fuses are eliminated and the block is formed to provide a suitable shelf-like support for either single or double pole switches which latter are connected in series with the fuses. The combined switch and fuse block 3a is shown in Fig. 30 and sectional views are shown in Figs. 36 and 42 in which the bus-bars and connectors are arranged to conform with certain circuit requirements.

The wide panel fuse block arrangement shown in Fig. 26 is similar to that illustrated in Fig. 1. However, the longitudinal and transverse gutters are eliminated as they are not necessary when switches are used. This embodiment is provided with single pole branch circuit switches 62 which are provided with insulating covers 63 secured to the fuse blocks 3a by means of screws 64. The switch handles extend through these covers and are accessible as illustrated.

Figure 27:
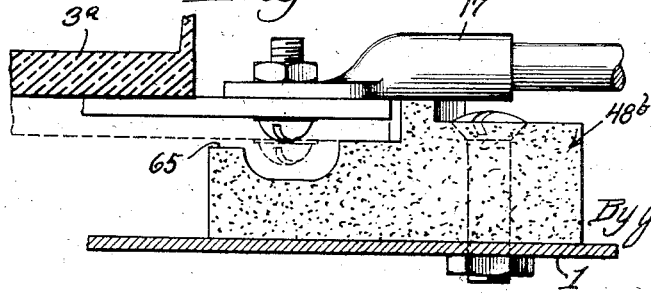
Fig. 27 is a detailed sectional view taken on a line corresponding to line 27—27 of Fig. 26 and illustrates the terminal insulating block and associating parts.

In this adaptation, the terminal covers 28 and 29 are used in the same manner as illustrated for the switchless panel in Fig. 1, and a common return terminal of suitable capacity may be used and the insulating partition 26 positioned in a corresponding relation thereto. In substantially all of the adaptations the terminal lugs 17 may be supported on the insulating block 48b (Fig. 27). This insulating block may be secured, as previously described, by means of screws 48c and is cut away at 65 to accommodate any thickness of bus-bars within the limits of the system.

When switches are used, the bus-bar arrangement is such that the bus-bars are in alignment with the lower surface of the fuse block 3a, this surface being also in alignment with the lug supporting surface of the insulating block 48b as shown. By this method the insulating block provides an efficient support for any standard size terminal lug, as well as allowing the use of a bus-bar of any desired thickness within the limits of the system as shown by dotted lines.

The fuse block 3a is provided with fuse center contact connectors 66 (Figs. 30, 37 and 42) which are secured to the fuse block as shown and may be connected to the switch terminals by means of screws 67. The opposite terminals of the switches are connected to the bus-bars in the various arrangements whereby the switches and fuses are in series with the bus-bar and branch circuit terminals.

In the embodiment illustrated in Figs. 26, 28 and 29, the bus-bar connection may be similar to that illustrated in Fig. 31 and which has been previously described in connection with the bus-bar arrangement for the switchless narrow panel (Fig. 20).

Figure 28:
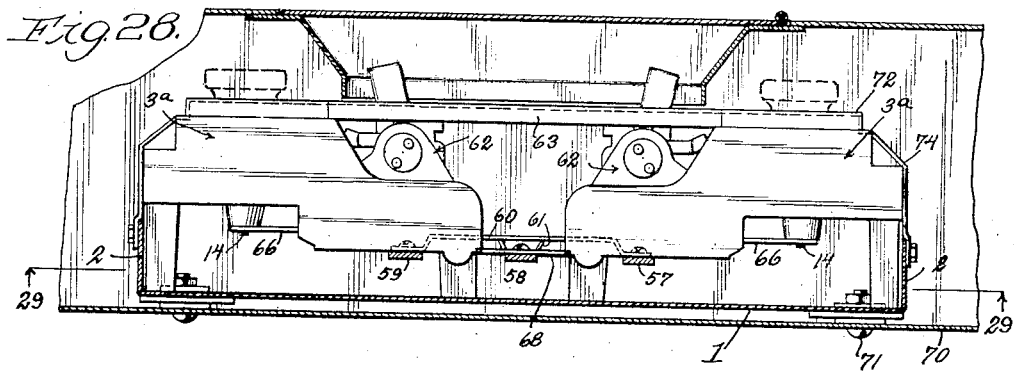
Fig. 28 is a transverse sectional view taken on a line corresponding to line 28—28 of Fig. 26, and illustrates the embodiment shown in Fig. 26 as mounted in a suitable panel board box or cabinet.
Figure 29:
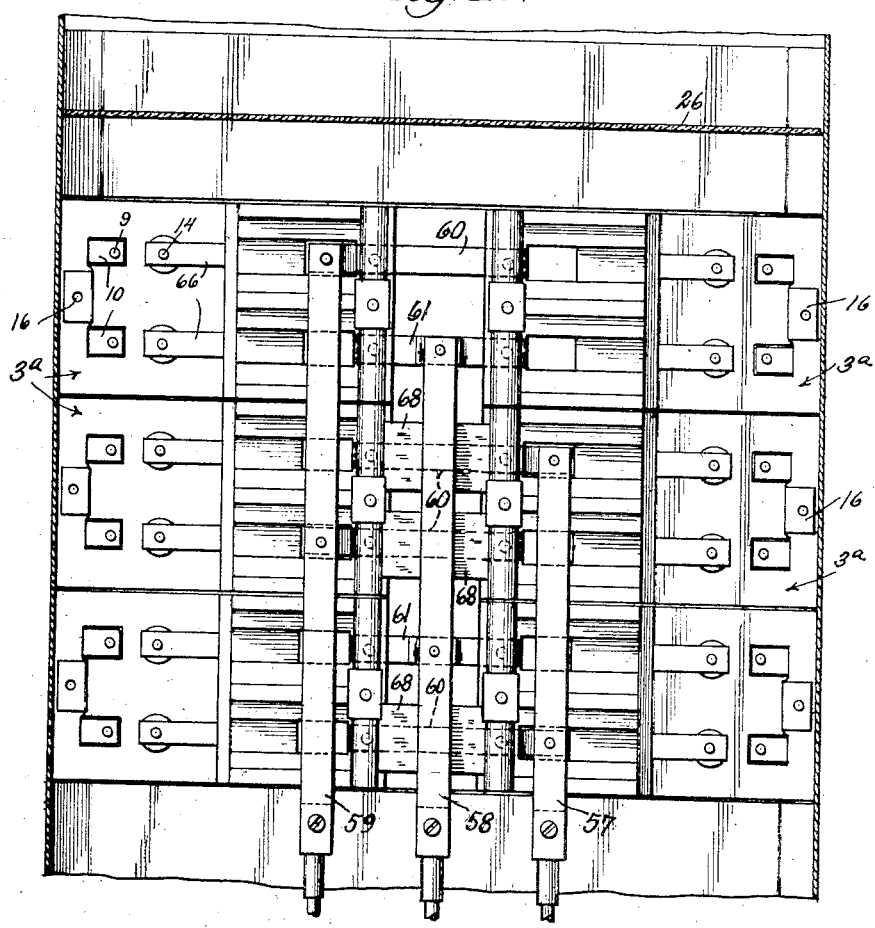
Fig. 29 is a bottom plan view of the panel board shown in Figs. 26 and 28 with the base plate shown in section on a line corresponding to line 29—29 of Fig. 28.

In the present instance, the bus-bars 57, 58 and 59 are connected to the switch terminals by means of the interchangeable connectors 60 and 61 and are thereby supported in alignment with the bottom surface of the fuse blocks 3a as shown in Figs. 28 and 29.

In order to provide a suitable insulation between the connectors 60 and the bus-bar 58, small insulating plates 68 are supported on the bus-bar 58 and are held in position by engagement with the fuse blocks.

In Fig. 28 the panel board is shown supported in a suitable panel board box or cabinet 70 by means of bolts 71 whereby the base plate 1 is adjustably supported from the rear wall of the cabinet. The adaptation just described may be wired in accordance with the diagram shown in Fig. 32 which provides a panel board adapted for use in a four-wire, three-phase circuit having single fuse common return branches with single pole switches in the branches.

As mentioned previously, either double pole or single pole switches may be used interchangeably in the fuse block 3a without change in the location of the fuse or switch connectors or terminals, and when double pole switches are used the same bus-bars and connectors may be used, and the board may be wired to provide a circuit as illustrated in Fig. 33 which is adapted for use with a three-wire circuit having double fuse branches with double pole switches in the branches.

Figure 40:
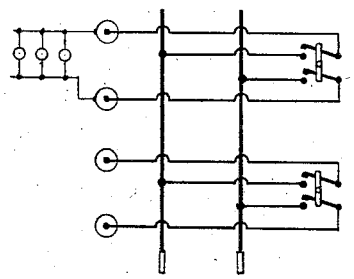
Fig. 40 is a wiring diagram for use with a two-wire main circuit having double fuse branches and double pole switches in the branches.

When it is desired to provide a narrow panel with switches, the combined switch and fuse blocks 3a are mounted on one of the base plates 1a in the same manner as the switchless fuse blocks previously described, and a board of this type is illustrated in Figs. 34, 35 and 40. The fuse blocks are equipped with single pole switches and Fig. 34 illustrates the manner in which the blocks may be mounted with switches and fuses in staggered relation to provide circuit terminals on each side of the board which is desirable in certain installations, and Fig. 40 illustrates the same fuse blocks 3a mounted on the base 1a but with fuses and also switches in alignment.

When the narrow panel is used with the blocks 3a, the switches are provided with insulating covers 72 removably secured to the fuse block by means of screws 73. These covers are provided with a downwardly extending flange portion 74 which conforms in contour with terminal covers 52 and 51, which latter have been described previously and which may be used interchangeably on all narrow panel boards.

The cover flange 74 rests on the base plate flange in the same manner as the terminal covers and is provided with a slot 75 by which it may be removably secured to the flange by means of screws 76.

Figure 41:
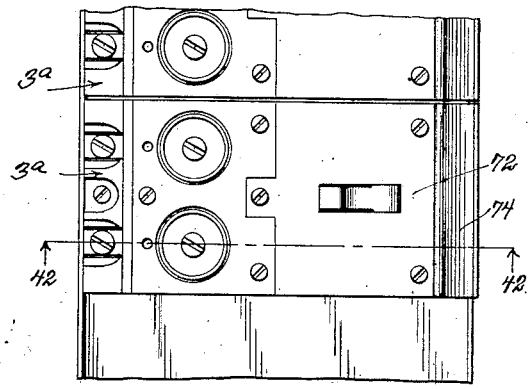
Fig. 41 illustrates a narrow panel having double pole switches with fuses in alignment.

The cover illustrated in Fig. 36 is for use with single pole switches and is provided with openings 77 therethrough for the switch handles. It should be understood that when double pole switches are used the cover may be provided with a single switch handle opening which is preferably centrally located as indicated in Fig. 41 in which is illustrated a portion of a panel board equipped with double pole switches with switches and fuses in alignment, the switch cover being provided with a central opening for the switch handle.

Figure 37:
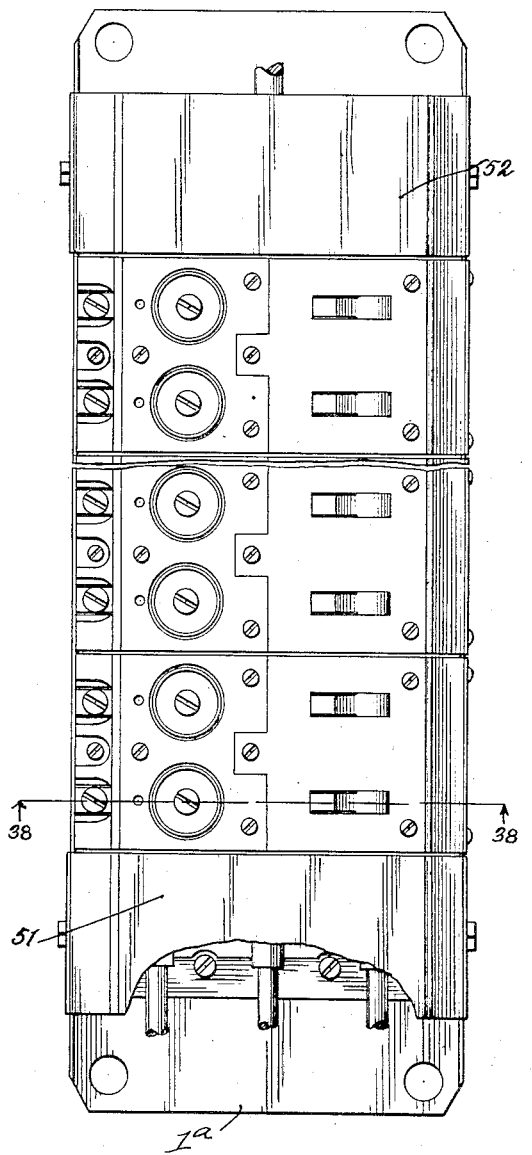
Fig. 37 is a top plan view of a narrow panel board with single pole switches and fuses in alignment. This embodiment may be arranged for use with either a three or four-wire circuit and single fuse branches.

The narrow panels with switches (Figs. 34 and 40) may be adapted for various circuit requirements and are illustrated as arranged for three and four-wire circuits, respectively. The bus-bar arrangement for the three-wire panel board is illustrated in Fig. 37 in which the bus bars 78 and 79 are provided with switch connectors 80 and 81, respectively.

Figure 38:
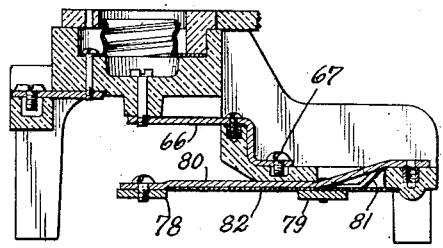
Fig. 38 is a sectional view through the switch block and taken on a line corresponding to line 38—38 of Fig. 37, the bus-bars being arranged for aligned fuses.

An insulator 82 is supported on the bus bar 79 to provide suitable insulation between the bus-bar 79 and the switch connector 80. These insulators are preferably comparatively narrow strips, one being placed under each connector 80 and retained in position in a depression 82a (Fig. 30) in the bottom of the fuse block 3a. This is the arrangement preferably used when the switches are in alignment. When arranged in staggered relation, the switch connectors 80 and 81 are connected alternately to the bus-bars 78 and 79, respectively. With this arrangement, these narrow panel boards may be wired in accordance with the diagram in Fig. 38 which is adapted for use with a three-wire, two-phase circuit having single fuse branches with a common return and with switches in the branches. This same bus-bar and connector arrangement is adapted for use with double pole switches and may then be wired in accordance with the diagram illustrated in Fig. 39 which provides a two-wire circuit having double fuse branches with double pole switches therein.

Figure 39:
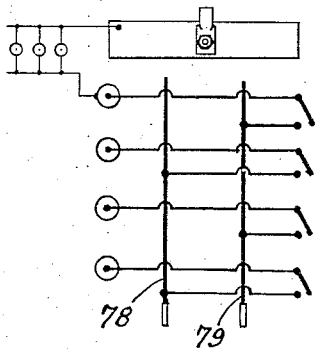
Fig. 39 is a wiring diagram for use with the embodiment shown in Fig. 37 and arranged for a three-wire, two-phase common return circuit having single fuse branches with single pole switches in the branches with fuses and switches in alignment.

When the circuit shown in Fig. 39 is used the neutral terminal is not used or may be entirely eliminated.

Figure 43:
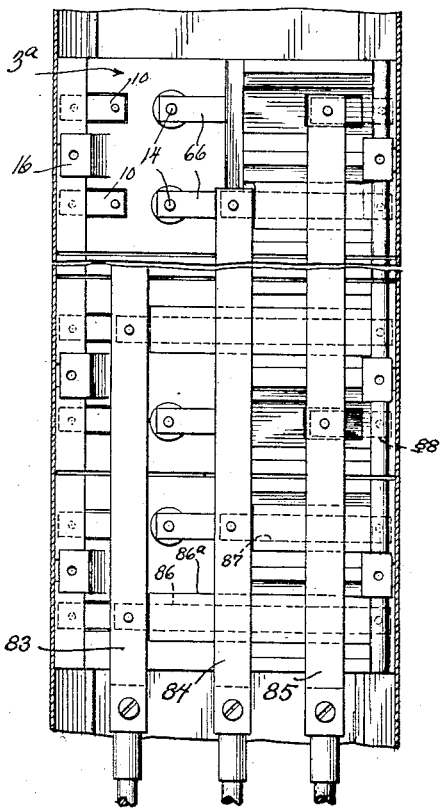
Fig. 43 is a bottom plan view of the panel board illustrated in Fig. 41.

When it is desired to adapt the narrow panel board having switches therein for use with three and four-wire circuits, the bus-bar arrangement shown in Figs. 42 and 43 may be used which includes bus-bars 83, 84 and 85 having switch connectors 86, 87 and 88 connected thereto and to the terminals of the switches. The particular arrangement of these connectors is shown in Fig. 43. The connectors are arranged to be connected to the terminals of the switches by means of screws 89 which are threaded in suitable bushings 90 in the base 3a. By this arrangement, the bus-bars 83, 84 and 85 are supported in alignment with the lower surface of the fuse block. A strip of insulating material 86a is supported between the switch connector 86 and the bus-bars 84 and 85 and a similar but shorter insulating strip 87a is supported between the switch connector 87 and the bus-bar 85. These strips are retained in the depressions 82a (Fig. 30) in the bottom of the fuse block 3a in the same manner as the insulator 82 described previously. All of the insulators are of a width sufficient to provide the required air and surface spacing of the conducting parts.

Figure 44:
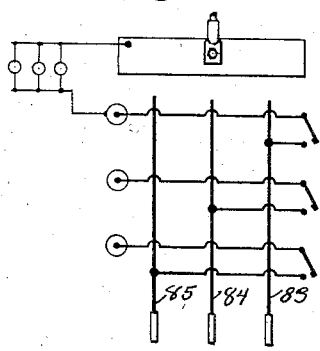
Fig. 44 is a wiring diagram for a four-wire, three-phase common return circuit having single fuse branches with single pole switches in the branches. This arrangement is adapted for use with the embodiment illustrated in Fig. 40.
Figure 45:
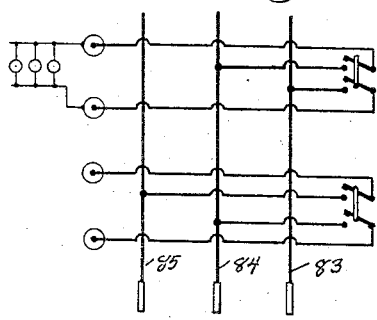
Fig. 45 is a wiring diagram for a three-wire, three-phase circuit having two fuse branch circuits and double pole switches in the circuits. This is adapted for use with the embodiment illustrated in Figs. 41 to 43, inclusive.

With the bus-bar arrangement just described, the panel board may be wired in accordance with the diagrams illustrated in Figs. 44 and 45, in which Fig. 44 illustrates a four-wire, three-phase circuit having single fuse branches with a common return and single pole switches in the branches, and Fig. 45 illustrates a three-wire circuit having double fuse branches with double pole switches in the branches.

It will be understood that standard double pole or single pole switches may be used interchangeably in the fuse block 3a and that the connector screws on the fuse and bus-bar connectors are arranged so that either the single or double pole switches may be connected thereto with no change in the fuse connectors or in the bus-bar connectors of any particular bus-bar arrangement with which it is desired to use either of these interchangeable switches.

As mentioned previously, the fuse blocks 3 and 3a are arranged to be interchangeably mounted on any of the base plates. While such an arrangement has not been specifically illustrated, it will be understood that any desired combinations of these fuse blocks may be mounted in any desired arrangement within the limits of the system to provide a panel board in which any required number of the branch circuits are provided with switches and the remaining branch circuits with fuses only and in any desired relation on the board. It will, therefore, be seen that the invention provides a combination of a minimum number of interchangeable parts which may be easily arranged to provide a panel board which will satisfy all of the requirements of substantially all main circuit and branch circuit requirements and which conforms in every particular to standard practice.

When a central wiring gutter is employed, or in the case of a wide panel having two rows of fuse blocks without switches as shown in Figs. 1 to 7, the underwriters require that the neutral terminal plate be suitably blocked off or separated from the different panel board units in a manner which will prevent wiremen from running wires over the neutral plate. A lateral gutter is therefore desirable as in Fig. 7. For the above and other reasons, the method of mounting the terminal plate and insulating partition adjacent thereto is especially important. The system provides simple and efficient means whereby suitable gutters are provided in the adaptations in which they are needed and positively prevents the placing of wires in undesirable positions.

As previously mentioned, the basic elements or units may be arranged to receive any desired type of standard fuses. However, all of the bus-bar and circuit connections will remain the same. The embodiments previously described have been arranged for use with standard plug fuses, and when it is desired to use standard type cartridge fuses, the fuse receptacles of the basic elements are slightly modified as illustrated in Figs. 46 to 50, inclusive.

The embodiment illustrated in Figs. 46 and 47 comprises a combined fuse and switch block 91 which is similar to the fuse block 3a and is arranged to receive either single or double pole switches in the same manner and the same bus-bar connections may be used to provide panel boards having exactly the same circuit and other electrical characteristics as when the block 3a is used. However, this block 91 is provided with fuse receptacles 92 having spaced fuse clips 93 and 93a therein, the fuse clips 93a being secured to the base by means of threaded bushings in the base and screws 94 therein provided for connecting the fuse clips to the switch terminals. The clips 93 are supported on the base and connected in a similar manner to the same branch circuit terminals, such as used in the units 3 and 3a. In all other respects these units 91 are the same as the units 3a and may be used interchangeably therewith.

The embodiment illustrated in Figs. 49 and 50 comprises a fuse block 95 which corresponds in all respects to the switchless fuse block 3 except that it is arranged to receive standard cartridge fuses instead of plug fuses as provided for in the fuse block 3.

The fuse block 95 is also provided with a plurality of fuse receptacles 92a having clips 93b and 93c therein. However, in the present instance the clips 93c are provided with connectors 96 connected thereto and extending downwardly as shown in Fig. 50 and having connector screws 97 therein which are arranged on the same centers as the center contact screws 14 in the fuse block 3. Therefore, by means of these connector screws 97 any of the bus-bars and connectors associated therewith may be connected to provide any of the circuits previously described in connection with the fuse block 3. The fuse clips 93b are also connected to the same branch circuit terminals as those previously described in connection with the fuse block 3. The fuse clips 93b are also connected to the same branch circuit terminals as those previously described for units 3. By means of this arrangement, interchangeable fuse blocks may be provided which will accommodate any of the circuit requirements and which may be arranged to receive any desired type of standardized fuse.

The integral downwardly extending legs of all of the units whereby they are secured to and supported on the base plates are all similarly located on the units to provide a completely interchangeable system, and these legs are suitably spaced to provide room therebetween for any of the bus-bar arrangements described herein, in a relation to provide air and surface spacing in accordance with all standard installation requirements.

The invention is capable of variations and modifications without departing from the spirit of the invention, and I desire to be limited only by the prior art and the scope of the appended claims.

Having thus described my invention, what I claim and desire to secure by Letters Patent is:

1. In a panel board system of the character described, a base, groups of interchangeable fuse blocks thereon arranged to provide a longitudinal branch circuit gutter therebetween, bus-bars supported by said blocks and provided with terminals, a common return terminal on said base, and an insulating wall between said common return terminal and said groups and arranged to provide a transverse gutter communicating with said longitudinal gutter.

2. In a panel board system of the character described, a base, groups of interchangeable fuse blocks thereon arranged to provide a longitudinal branch circuit gutter therebetween, bus-bars underneath and supported by said blocks and provided with bus-bar terminals adjacent one end of said board, a common return terminal supported on said base and adjacent the opposite end of said board, and an insulating wall extending substantially the entire width of said board and supported between said common return terminal and said groups and spaced from said groups to provide a transverse gutter therebetween communicating with said longitudinal gutter.

3. In a panel board system of the character described, a sheet metal base having upturned side flanges, a plurality of interchangeable fuse blocks mounted in alignment adjacent each flange to provide a longitudinal branch circuit gutter between said aligned blocks, bus-bars supported by said blocks and provided with terminals adjacent one end of said board, a common return terminal plate mounted on said base, an insulating partition between said common return terminal and said blocks and arranged to form a transverse gutter therebetween communicating with said longitudinal gutter, interchangeable terminal covers supported on said flanges, and a cover for said transverse gutter conforming in contour with said terminal covers and removably supported on said flanges and provided with outlet passages for the branch circuit wires.

4. A panel board of the character described comprising a sheet metal base having upturned side flanges, fuse blocks and associated parts on said base, terminals adjacent each end of said board, and U-shaped sheet metal terminal covers removably and interchangeably supported on said flanges, the upper surface of said covers being substantially in alignment with the top of said fuse blocks.

5. In a panel board system, the combination with a sheet metal panel board base having upturned side flanges, of sheet metal terminal covers conforming substantially to the transverse contour of the board and having downturned flanges supported on said upturned base flanges to hold said covers in alignment, and releasable locking means for interchangeably securing said covers.

6. A panel board of the character described comprising a sheet metal base having upturned side flanges, a row of interchangeable fuse blocks mounted on said base adjacent each of said flanges to provide a longitudinal gutter between said rows, bus-bars on said blocks and provided with terminals adjacent one end of said board, a common return terminal adjacent the opposite end of said board, U-shaped sheet metal terminal covers removably supported on said base flanges, said common return terminal cover being spaced from said blocks and having a transverse insulating partition adjacent thereto arranged to provide a transverse gutter communicating with said longitudinal gutter, a cover for said longitudinal gutter and removably supported on said terminal covers, and a transverse gutter cover removably secured to said base flanges and provided with openings for the passage of branch circuit wires.

7. In a panel board having a base and a fuse block supported on and spaced therefrom, bus-bars having terminals thereon and secured to said fuse block, and an insulator arranged to support said terminals and extending under said bus-bars, the upper surface of said insulator being substantially in alignment with the bottom surface of said fuse block whereby bus-bars and terminals of various capacities may be supported with fuse block and insulator in the same relation.

8. In a panel board system, a base, a plurality of fuse blocks mounted on said base, a plurality of bus-bars on said fuse blocks and having their upper surfaces in alignment with the bottom of said fuse blocks, and an insulating terminal support mounted on said base and having its upper surface in alignment with the upper surface of said bus-bars and the lower surface of said fuse blocks, whereby any size terminal and any size bus-bar within the limits of the system may be used with the same fuse blocks and terminal insulator and in the same surface relation.

9. A neutral-terminal and partition support for a panel board base comprising an insulator, means for securing said insulator either longitudinally or transversely on said base, spaced portions of said support being arranged to receive the binder screws of a terminal plate, and a transverse insulating partition adjacent said block and supported therefrom.

10. A mounting for interchangeable common return terminal plates of the character described comprising an insulating mounting block, means for securing said block substantially on its vertical axial line to said panel board base, and means for supporting one of said common return terminal plates on said block in a fixed position, said block being arranged to support another of said terminal plates when said block is moved approximately ninety degrees on its axis.

11. In a panel board of the character described comprising a base having a plurality of fuse blocks thereon, means for mounting interchangeable terminal plates adjacent one end of said board and spaced from said blocks, said mounting comprising insulating means mounted for rotation on a vertical axis, said mounting means being arranged to receive branch circuit binder screws for securing said terminal plates thereon, an insulating partition between said fuse blocks and said terminal plates, and means for supporting said partition on said terminal plate support.

12. In a panel board of the character described comprising a base having a plurality of fuse blocks thereon, means for mounting interchangeable terminal plates adjacent one end of said board and spaced from said blocks, said mounting comprising insulating means mounted for rotation on a vertical axis, said insulating means being rotatable on its securing means for alignment to receive branch circuit binder screws of one or the other of said terminal plates to thereby support said plate, an insulating partition between said fuse blocks and said terminal plates, and means for supporting said partition on said terminal plate support.

13. In a panel board system, the combination with a metal base having units thereon to form a panel board, sheet metal covers conforming substantially to the transverse contour of the board and having downward flanges resting on said base, and releasable locking means for securing said covers to said base.

REUBEN B. BENJAMIN.